Patented June 30, 1953

2,643,998

UNITED STATES PATENT OFFICE 2,643,998

STABLE ANTIBIOTIC SOLUTIONS

Malcolm D. Bray, Noblesville, Ind., assignor to Eli Lilly and Company, Indianapolis, Ind., a corporation of Indiana No Drawing. Application July 1, 1950,
Serial No. 171,764

3 Claims. (Cl. 260—210)

This invention relates to antibiotic-containing solutions and more particularly to stable aqueous solutions containing streptomycin and dihydrostreptomycin.

It is known that streptomycin and dihydrostreptomycin whether in the form of their bases or salts, gradually decompose upon standing in aqueous solution. For that reason, those antibiotics have not been supplied to the trade in the form of aqueous solutions immediately ready for parenteral administration, since in ordinary practice the period of time elapsing between the manufacture of the antibiotic solution and its use would be sufficiently lengthy to permit an appreciable decomposition of the antibiotic, thus rendering the solution unsuitable for administration. Consequently, it has been the required practice to supply streptomycin and dihydrostreptomycin in the form of dry solids, and all solutions to be used parenterally have necessarily been made up just prior to therapeutic administration of the antibotic. The disadvantages of such a procedure are obvious.

I have now discovered that stable aqueous solutions of streptomycin and dihydrostreptomycin are obtained by providing compositions which comprise the antibiotic dissolved in an aqueous medium containing in relatively small amount a stabilizing agent of the class consisting of thioglycerol, thiosorbitol and thioglucose. The antibiotic solutions provided by this invention are quite stable, and accelerated aging tests have indicated they possess a stability at room temperature of many years duration. Moreover, the solutions do not become highly colored on standing as do unstabilized solutions.

In providing the stable aqueous solutions of this invention, the antibiotic, i. e. streptomycin, dihydrostreptomycin, or a salt thereof is dissolved in a water solution which contains or to which is added thereafter, an effective amount of the stabilizing agent. The amount of stabilizing agent employed is not critical and amounts ranging from about 0.1 percent to 5 percent or more (weight/volume) provide satisfactory stabilization. The preferred range of stabilizer is from about 0.5 to about 1 percent, such concentration providing excellent stabilization even of concentrated solutions of the antibiotic.

To provide pharmaceutically acceptable solutions, there are desirably incorporated in the solution other ingredients of known utility. Thus for example, a small amount of phenol or similar agent is added to the solution to serve as a preservative. Furthermore, suitable buffers are added to provide a pH most favorable to stability of the antibiotic agent, since as is well known, streptomycin and dihydrostreptomycin are unstable when subjected to excessively acidic or basic conditions.

The following compositions illustrate stable antibiotic solutions in accordance with this invention. In those illustrative examples the amounts of the components are expressed by weight.

A stable aqueous solution of streptomycin containing thioglycerol as a stabilizer is as follows:

| | Parts |
|---|---|
| Streptomycin sulfate | 58.3 |
| Sodium citrate | 1.25 |
| Thioglycerol | 1.0 |
| Phenol | 0.25 |
| Water | 55.0 |
| Sulfuric acid q. s. to pH 6. | |
| Water q. s | 100.0 |

Because of the presence of the thioglycerol in the above solution, the solution even when freshly prepared is much less colored than is a comparable solution which contains no thioglycerol. The streptomycin sulfate now commercially available is not entirely pure and when it is dissolved in water a brownish colored solution is obtained.

A stable aqueous solution of dihydrostreptomycin containing thioglycerol as a stabilizer is as follows:

| | Parts |
|---|---|
| Dihydrostreptomycin base | 15.0 |
| Sodium citrate | 1.0 |
| Thioglycerol | 0.3 |
| Phenol | 0.25 |
| Water | 55.0 |
| Sulfuric acid q. s. to pH 7.3. | |
| Water q. s | 100.0 |

A stable aqueous solution of streptomycin containing thioglucose as a stabilizer is as follows:

| | Parts |
|---|---|
| Streptomycin base | 25.0 |
| Sodium citrate | 1.5 |
| Thioglucose | 0.5 |
| Phenol | 0.5 |
| Water | 50.0 |
| Hydrochloric acid q. s. to pH 6.0. | |
| Water q. s | 100.0 |

A stable aqueous solution of dihydrostreptomycin containing thiosorbitol as a stabilizer is as follows:

| | Parts |
|---|---|
| Dihydrostreptomycin phosphate | 60.0 |
| Trisodium phosphate | 2.0 |
| Thiosorbitol | 2.0 |
| Phenol | .25 |
| Water | 55.0 |
| Hydrochloric acid q. s. to pH 7.0. | |
| Water q. s | 100.0 |

A stable aqueous solution of dihydrostreptomycin containing thioglycerol as a stabilizer is as follows:

| | Parts |
|---|---|
| Dihydrostreptomycin sulfate | 58.0 |
| Sodium citrate | 1.5 |
| Thioglycerol | 1.0 |
| Phenol | 0.25 |
| Water | 55.0 |
| 10 percent aqueous sodium hydroxide q. s. to pH 7.3. | |
| Water q. s | 100.0 |

The above illustrative compositions are sterilized as by filtration through a Berkefeld filter or the like, and when sterile are filled into pharmaceutical vials for distribution to the trade.

It will be obvious to those skilled in the art that many modifications in composition and concentrations can be made in the above illustrative mixtures. Thus for example, in place of the antibiotic base or the sulfate or phosphate salt, other water-soluble salts can be employed, e. g. the streptomycin or dihydrostreptomycin calcium chloride double salts. The particular salt employed in preparing the compositions of this invention is of relatively little moment, provided that the salt is one which contains a relatively nontoxic anion, since in aqueous solutions the antibiotic exists largely in ionized form and is dissociated from the anion.

As mentioned hereinabove, the solutions preferably are adjusted to a controlled pH range to secure conditions most favorable to stability. The presently preferred pH for streptomycin-containing compositions is about pH 6.0, and that for dihydrostreptomycin is about 7.3. To provide the preferred pH in the antibiotic solutions other buffers, acids, and bases can be used in place of the ones used in the above examples, and the proportions of those components in the mixtures can be varied as needed.

By this invention not only can compositions for parenteral use be prepared, but also stable oral preparations are made possible. The latter are made up in general the same as the parenteral compositions, and contain one or more of the customary flavoring agents to provide pleasant tasting compositions, and such other ingredients such as thickening agents and the like as are commonly employed.

I claim:

1. A composition comprising an aqueous solution of one member of the group of antibiotics consisting of streptomycin and dihydrostreptomycin, and, on a weight/volume basis, from about 0.1 to about 5 percent of a stabilizing agent of the class consisting of thioglycerol, thiosorbitol and thioglucose.

2. A composition comprising an aqueous solution containing streptomycin, and thioglycerol in an amount on a weight/volume basis of about 0.1 to about 5 percent.

3. A composition comprising an aqueous solution containing dihydrostreptomycin, and thioglycerol in an amount on a weight/volume basis of about 0.1 to about 5 percent.

MALCOLM D. BRAY.

References Cited in the file of this patent

UNITED STATES PATENTS

| Number | Name | Date |
|---|---|---|
| 2,047,144 | Kharasch | July 7, 1936 |
| 2,442,461 | Karrer | June 1, 1948 |
| 2,473,339 | Kirchmeyer | June 14, 1949 |
| 2,498,200 | Bray | Feb. 21, 1950 |

OTHER REFERENCES

Anderson et al., "Antibiotic Activity of Subtilin and Streptomycin in the Presence of BAL," Science, December 26, 1947, pages 643 and 644.

Journal of Pharmacology and Experim. Thera., April 1950, volume 98, Number 4, part 2, page 13.

Science, "Retardation of Rancidity by Sulfhydryl Compounds," volume 98, Number 2554, December 10, 1943, pages 518 and 519.